US006136907A

United States Patent [19]
Sunamori et al.

[11] Patent Number: 6,136,907

[45] Date of Patent: Oct. 24, 2000

[54] PROCESS FOR PRODUCING DISPERSION OF FUNCTIONAL COMPOUND

[75] Inventors: Takashi Sunamori, Funabashi; Kyozo Yoshino, Yachiyo; Kiyoshi Shingae, Matsudo; Kazuhisa Yamaguchi, Tokyo; Shigekazu Suzuki, Yamato; Fujio Takiguchi; Takeo Moriyama, both of Tokyo, all of Japan

[73] Assignee: Taisei Chemical Industries, Ltd., Tokyo, Japan

[21] Appl. No.: 09/140,417

[22] Filed: Aug. 26, 1998

[30] Foreign Application Priority Data

Aug. 29, 1997 [JP] Japan .................................... 9-234189

[51] Int. Cl.[7] ........................................ C08K 3/18

[52] U.S. Cl. ........................................ 524/430

[58] Field of Search ........................................ 524/430

[56] References Cited

U.S. PATENT DOCUMENTS

| | | | |
|---|---|---|---|
| 4,381,349 | 4/1983 | Lee | 521/28 |
| 4,668,719 | 5/1987 | Kato | 523/458 |
| 4,764,539 | 8/1988 | Ladang | 106/122 |
| 5,529,871 | 6/1996 | Ichimura et al. | 430/106 |

FOREIGN PATENT DOCUMENTS

| | | |
|---|---|---|
| 4-39671 | 2/1992 | Japan . |
| 4-242752 | 8/1992 | Japan . |
| 6-130724 | 5/1994 | Japan . |

OTHER PUBLICATIONS

Randolph, Jeffrey, K., CDR Pigments & Dispersion, "European Ink Maker", *Polymers Paint Color Journal*, Apr. 27, 1994, vol. 184, No. 4348, pp. S4–S5.

*Primary Examiner*—Paul R. Michl
*Attorney, Agent, or Firm*—Pillsbury Madison & Sutro

[57] ABSTRACT

There are provided a finely dispersed material of a functional compound such as pigment or the like in the state of its inherent average particle diameter and a process for producing a finely dispersed material of a functional compound into a binder resin, in which the compound is dispersed in the state of its inherent average particle diameter not more than 3 microns, in spite of using the functional compound having an apparently large average particle diameter by agglomeration in comparison with the inherent average particle diameter of the compound, wherein when the above compound before dispersion is apparently in the dry state, de-ionized water is added thereto to form a hydrous paste of the compound and then this hydrous paste is contacted with a substance having an ion-exchange function selected depending upon the properties of the impurity ions contained in the above functional compound in a mixed solvent composed of de-ionized water and an organic solvent miscible with water to remove the impurity ions, and the impurity ion-free hydrous paste thus obtained is thereafter dispersed in the binder resin, or when the above compound before dispersion is already in the form of a hydrous paste, this hydrous paste is directly contacted with the selected substance having ion-exchange function by the same method described in the case of the dry state, and the impurity ion-free hydrous paste thus obtained is thereafter dispersed in the binder resin.

8 Claims, 2 Drawing Sheets

PROCESS FOR PRODUCING DISPERSION OF FUNCTIONAL COMPOUND

BACKGROUND OF THE INVENTION

This invention relates to a process for producing a material composed of a functional compound finely dispersed into a binder resin.

In the explanation in detail, this invention relates to a process for dispersing finely the compounds having various functions such as pigments having a coloring function, functional dyes having a photo-dichroism, magnetic materials having magnetic recording characteristics, ultra-violet absorbers and the like into a binder resin, in order to disperse the compounds in a binder resin faithfully to the primary particle size distributions that the compounds keeping inherently by destroying agglomeration of particles of the compounds to free individual particles.

In the another explanation in detail, this invention relates the so-called sub-micron dispersion technique which means the technique to obtain the dispersed particles having particle size distributions of less than 1 micron.

The material of an above compound dispersed into a binder resin is used in fields relating to high-tech apparatus such as an ink for ink jet, a paint or ink for color filter for flat display, a colorant for toner for a color-copying machine, a coating composition for a polarized light filter, an other intermediate material containing the functional compound finely dispersed for producing an electronic device and the like.

The method for dispersing the functional compound is broadly classified into the following two procedures (EUROPEAN INK MAKER, Apr. 27, 1994, Vol. 184, No. 4348, pages 52 to 53):

1) A procedure of dispersing a finely divided and dried compound.
2) A procedure of dispersing a hydrous paste of a finely divided compound.

The procedure 1) is a general one which has heretofore been used, and the dispersing machines which have been often used include three roll mill, twin roll mill and high-speed dispersing machines in which a medium is used, for example, pebble mill, sand mill and the like, and recently further include dispersing machines for grinding in which a hard, fine material such as zirconium or the like is used as the medium. The fact is that using these machines, the functional compound is dispersed in a dispersing agent or a resin which has an affinity for the functional compound. According to this procedure, the operation is relatively simple, but in the dried compound, there coexist rough particles formed by agglomeration of the compound, so that in order to break the rough particles apart into the original finely divided particles, namely primary particles, it is actually unavoidable to make the dispersing step unnecessarily long or to carry out the dispersion using a very expensive dispersing machine at the sacrifice of a production speed. Moreover, the fact is that with some lots of the compound, the agglomerated particles cannot be broken apart into the original primary particles.

Whether or not the procedure 2) is higher in economical efficiency than the procedure 1) has long been discussed, and the procedure 2) has been adopted case by case. The procedure 2) comprises kneading with heat a resin as a binder, a dispersing agent having an affinity for the above compound as occasion demands, and a hydrous paste, namely a pressed cake, of the functional compound which has been filtrated to remove a large amount of water from the aqueous suspension of the finely divided and washed functional compound after having been chemically synthesized.

In this kneading process, a kneaded mixture release the water content by a phase separation and the above compound is dispersed in the binder resin.

In this kneading process, if necessary, the mixture to be kneaded may be kneaded under pressure applied by a plunger. As the recent technical level, an example is disclosed in U.S. Pat. No. 5,529,871; JP-A 4(1992)-39,671; JP-A 4(1992)-242,752; JP-A 6(1994)-130,724; and the like. This procedure uses a hydrous paste of the above compound, so that in almost all cases, no agglomerate of the compound coexists and the dispersion is relatively easy; however, it is disadvantageous in that a long period of time is required for removing water and much energy is consumed therefor. In addition, it is the fact that with the functional compound having an affinity for water, a long period of time is required for removing the water content.

SUMMARY OF THE INVENTION

The present inventors have made research for chemically finding out what is the factor of allowing a functional compound to agglomerate and have consequently found that the factor is an ionic impurity, and the resulting agglomerate can easily be broken apart into its original particles by contacting the agglomerate with a substance having an ion-exchange ability to remove the ionic impurity by ion exchange. Moreover, even when the above compound has a remarkably large affinity for water, water can be easily removed by using a kneading machine as a reactor, combining this kneading machine with a vacuum distiller and conducting vacuum distillation with kneading. This invention is based on the above knowledge.

An object of this invention is to overcome the above-mentioned disadvantages of the prior art, to thereby obtain effectively a finely divided article dispersion regardless of the kind of the functional compound, and also to carry out the above dispersion advantageously in industry.

Other objects and advantages of this invention will become apparent from the following description.

According to this invention, there is provided a process for producing a finely dispersed material of a functional compound into a binder resin, in which the compound is dispersed in the state of its inherent average particle diameter not more than 3 microns, in spite of using the functional compound having an apparently large average particle diameter by agglomeration in comparison with the inherent average particle diameter of the compound.

In the procedure of this invention, when the above compound before dispersion is apparently in the dry state, de-ionized water is added thereto to form a hydrous paste of the compound and then this hydrous paste is contacted with a substance having an ion-exchange function selected depending upon the properties of the impurity ions contained in the above functional compound in a mixed solvent composed of de-ionized water and an organic solvent miscible with water to remove the impurity ions, and the impurity ion-free hydrous paste thus obtained is thereafter dispersed in the binder resin.

In the above described procedure, when the above compound before dispersion is already in the form of a hydrous paste, this hydrous paste is directly contacted with the selected substance having ion-exchange function by the same method described in the case of the dry state, and the impurity ion-free hydrous paste thus obtained is thereafter dispersed in the binder resin.

As the dispersion method after the removal of the impurity ions, there are mentioned a method comprising kneading the hydrous paste after the above treatment with the binder resin at a temperature not lower than the softening point of the binder resin at a reduced pressure of not more than 1 atm. in a kneading machine equipped with an internal temperature-controlling means, a variable cooling water amount-controlling means, a vapor condenser, a distilled liquid receiver, an exhausting means for reducing pressure and a kneading means having a twin screw, thereby simultaneously conducting the water-removal and the dispersion in the binder resin in a closed system; a method of obtaining an aqueous dispersion by a general dispersion procedure which has heretofore been used; and the like.

The process of this invention including the water-removal and the dispersion in a binder resin is as shown in, for example, FIG. 1.

Figure 1:
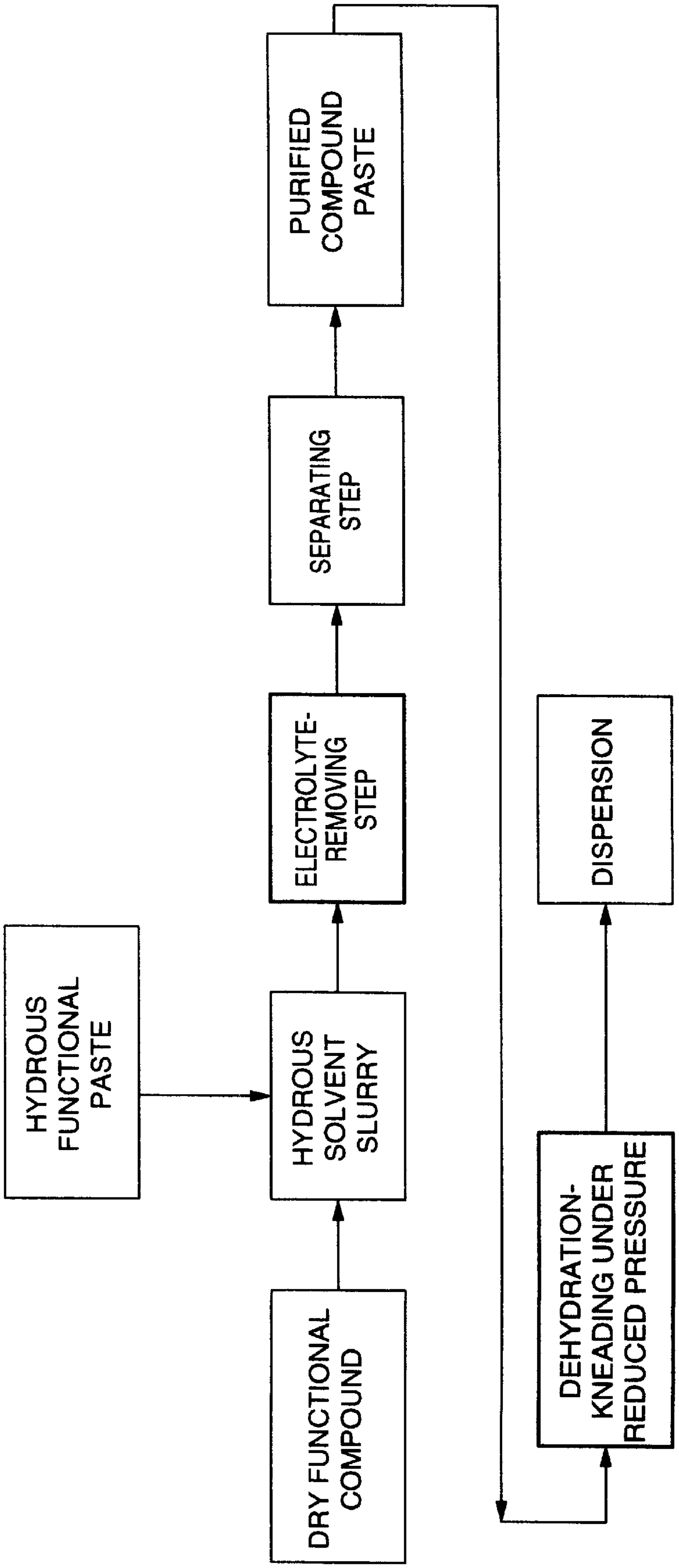
FIG. 1 is an explanatory view illustrating the steps in this invention.
Figure 2:
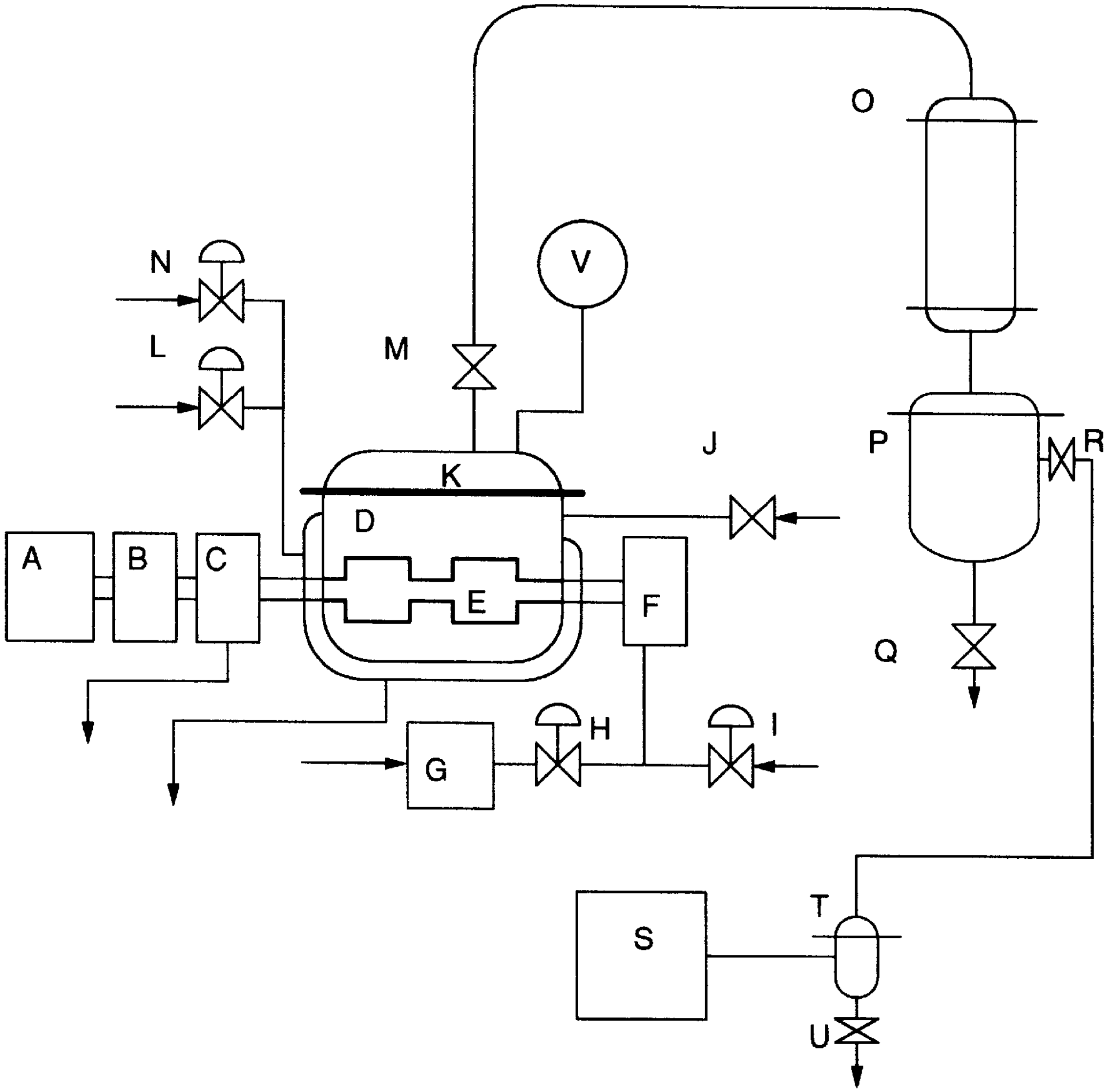
FIG. 2 is an explanatory view showing the construction of an apparatus example for carrying out this invention.

The alphabetic letters used in FIG. 2 have the following meanings:

A refers to a driving part, B to a speed reducing part, C and F to rotary joints, D to a kneading chamber, E to a twin screw, G to a booster pump, H to a control valve, I to a control valve, J to a pressure control valve, K to a top cover, L to a control valve, M to an operating valve, N to a control valve, O to a condenser, P to a receiver, Q to an operating valve, R to an operating valve, S to an exhaust pump, T to a trap, U to an operating valve and V to a pressure gauge.

DETAILED DESCRIPTION OF THE INVENTION

As the functional compounds in the form of particles, there are mentioned compounds having various functions such as coloring function, magnetic characteristics, flame-retardant function, function of special dyes, function of near infrared ray absorption, function of ultraviolet ray absorption and the like, and examples of compounds having the respective functions are as follows:

Functional compounds having a coloring function used in not only paint and ink but also toner for color copying, color filter and the like are pigments, which include, for example, inorganic pigments such as titanium dioxide, zinc oxide, basic lead sulfate, calcium plumbate, zinc phosphate, aluminum phosphate, zinc molybdate, calcium molybdate, yellow lead, synthetic yellow iron oxide, transparent red oxide, titanium yellow, zinc yellow, strontium chromate, red oxide, red lead, chrome vermillion, basic lead chromate, chromium oxide, Prussian blue, ultramarine blue, cobalt blue, calcium carbonate, barium sulfate, talc, clay, silica, mica, graphite, iron black, carbon black and the like and complex pigments thereof and further include organic pigments such as monoazo red, quinacridone Red, monoazo red Mn salt, monoazo Bordeaux Mn salt, monoazo maroon Mn salt, anthanthrone red, anthraquinonyl red, perylene maroon, quinacridone Magenta, perylene(Red, diketopyrrolopyrrole, benzimidazolone orange, quinacridone Gold, monoazo yellow, cis-azo Yellow, isoindolinone yellow, metal complex salt azo yellow, quinophthalone yellow, benzimidazolone yellow, copper phthalocyanine green, brominated phthalocyanine green, copper phthalocyanine blue, indanthren Blue, dioxane violet, fast yellow group, permanent yellow HR, acetanilide type monoazo yellow, Lake Red 4R, Permanent Carmine FB, Brilliant Fast Scarlet, Pyrrazolone Red B, Watchung Red metal salts, Lithol Red Ba salt, Brilliant Carmine 6G, Bordeaux 10B, Rhodamine 6G Lake, condensation type azo red, Naphthol AS Red and the like; fluorescent pigments having water resistance; etc. Moreover, coloring matters which are hardly dissolved in water and used in cosmetics or the like are mentioned.

Furthermore, as the functional compound having magnetic characteristics, there are mentioned, for example, silicon carbides, ferrites such as barium ferrite, γ-iron oxides, boron nitrides and the like; and as the functional compound having a flame-retardant function, there are mentioned hydroxides of magnesium, aluminum and the like, basic magnesium sulfate, wallastonite, calcium silicate and the like; and as other functional compounds, there are mentioned, for example, functional coloring matters such as coloring matters having an ability to absorb a near infrared light, electrochromic coloring matters, photochromic coloring matters, dichromatic coloring matters for polarizing film, thermochromic coloring matter, piezochromic coloring matters and the like; ultraviolet absorbing agents having an ability to absorb an ultra-violet light and the like; etc.

In this invention, as the binder resin which is a dispersing medium in which the functional compound is to be dispersed in the form of finely divided particles, there are mentioned resins, for example, polyester resin, vinyl chloride resin, acrylic resin, ethylene-vinyl acetate resin, cellulose acetates butyrate resin, modified polyethylene resin and the likes, which may be used alone or in composite system, and also such resins as urethane resin, epoxy resin and the like and modified resins thereof.

In the kneading-distilling step in this invention, the hydrous paste of the functional compound is kneaded with at least one type of binder resins under reduced pressure to disperse the hydrous paste into the resin and simultaneously remove the water content released by phase separation by vacuum distillation, so that it is preferable that the resin has such a softening point that it flows sufficiently at the temperature in said step. Even when the softening temperature of the resin per se is high, the resin can be softened with a vacuum-distillizable solvent or plasticizer and hence the above step can be appropriately carried out by selecting a solvent or plasticizer which can be removed by distillation together with the water content (steam). In this case, the solvent or plasticizer used is preferably such as to form an azeotropic mixture with water and keep the step temperature at not more than 120° C. As the solvent which can be used, there are mentioned, for example, methanol, ethanol, propanol, isopropyl alcohol, acetone, methyl ethyl ketone, methyl isobutyl ketone, cyclohexanone, methyl Cellosolve, ethyl Cellosolve, tetrahydrofuran, toluene, ethyl acetate, butyl acetate and the like, and it is sufficient to add the above solvent or plasticizer in such a small amount that the resin is plasticized. However, as a matter of course, the solvent or plasticizer should be selected so as not to cause the situation that it is impossible to remove the solvent or plasticizer even by vacuum distillation.

An explanation is made below of the contact treatment of the functional compound with a substance having an ion-exchange function (electrolyte-removing treatment for breaking the agglomeration of the functional compound) in this invention. The functional compound is usually used in the form of finely divided particles and the present inventors have found that almost all particles have adsorbed thereon water content and impurities because of the broad surface areas and surface chemical activities which the particles have. The present inventors have inferred that these impurities which the functional compound particles have would be a cause of the agglomeration of the functional compound and have reached a means capable of removing the impurities to promote the dispersion. In fact, the present inventors have experienced that as shown in the Examples which appear hereinafter, even in the case of the same functional compound, there are some lots of the compound produced in which the compound cannot be dispersed in the form of fine particles having a smaller size than a certain size even when the most effective dispersing procedure is used; however, that the difference between the case in which the dispersion in the form of fine particles is impossible and the case in which the dispersion in the form of fine particles is possible results from the presence of electrolytic impurities has been grasped by finding that the dispersion in the form of fine particles is made possible by removing the impurities by applying the electrolyte-removing procedure in this invention. According to this procedure, it is sufficient that the functional compound which is dried or wetted with water is contacted with a substance having ion-exchange characteristics in water or a water-containing organic solvent. This substance having ion-exchange characteristics is removed, or need not be removed if the remaining thereof in the form of fine particles causes no adverse effect. Moreover, if the substance having this function acts on the functional compound as a wetting agent or a dispersing agent, it is more preferable. The organic solvent to be used in the above procedure may be appropriately selected from the above-mentioned organic solvents.

As the substance having ion-exchange characteristics to be used in this invention, there are mentioned ion-exchange resins and other materials having ion-exchange characteristics. First of all, the ion-exchange resin is selected from strongly basic anion-exchange resins, weakly basic anion-exchange resins, strongly acidic cation-exchange resins, weakly acidic cation-exchange resins and the like depending upon the properties of the impurities contained in the functional compound to be treated with the above substance. The ion-exchange resin may be of the porous type or gel type. Furthermore, it may also be of the chelate type. Among them, the cation-exchange resin may be activated to the H type and the anion-exchange resin to the OH type, before use. These ion-exchange resins are commercially available, so that the most effective ones can be selected by subjecting the commercially available ones to aptitude test. Moreover, the form of the ion-exchange resin includes particle form and fiber form and they are used properly depending upon the purpose. An ion-exchange resin in the form of a powder can also be used.

The above-mentioned materials having ion-exchange characteristics other than the ion-exchange resins include high molecular weight compounds having a chemical structure similar to the ion-exchange resin. As these high molecular weight compounds, an ordinary resin having alone an acid group or a base group in the polymer chain may be used in this purpose. However, amphoteric poly-electrolytes in which an acid group and a base group are allowed to coexist with each other in the macro molecular chain are more effective. As these high molecular weight compounds, there can be used an acrylic type, a polyester type, a urethane type, an epoxy type, a composite type thereof and a modified type thereof. These can be synthesized or selected from commercially available ones. A so-called surface active agent which has ion-exchange characteristics and a relatively low molecular weight can also be used for the above purpose. In particular, amphoteric electrolyte surface active agents are preferred. As those having amphoteric electrolyte characteristics, there can be used amino acids having various isoelectric points. Proteins having a similar chemical structure can also be used.

The contact of the hydrous paste with the substance having an ion-exchange function can be conducted by circulating the hydrous paste in a column packed with the above substance in a temperature range in which the function of the above substance is not impaired or by mixing with stirring the above substance and the hydrous paste in a batchwise system and then subjecting the resulting mixture to filtration and centrifugation. Among them, the circulation-in-column method is preferred. A paste of the thus electrolyte-removed functional compound in an hydrous organic solvent is introduced into a reactor equipped with a stirring means, a vacuum-distilling means and a temperature-controlling means together with the resin into which the functional compound is intended to be dispersed and, if necessary, an additive, and the resulting mixture is then kneaded with controlling the temperature and the reduced pressure under such conditions that dehydration and kneading are efficiently effected. Preferably, the mixture is completely dehydrated. In some cases, a kneaded material of the functional compound dispersed into a binder resin is obtained in the block from. This can, however, be used after being crushed by an appropriate mill.

As described above, almost all functional compounds have adsorbed water on their surface by a synthesis process to fine particle states. The adsorbed water becomes a medium and the impurity electrolytes exist therein. The electrolytes govern the agglomeration of the functional compound. However, the adsorbed water per se is clearly an impurity and is considered to govern the agglomeration by its hydrogen-bonding force. In general, in the case of a compound having a large polarity such as water, an alcohol or the like, its molecules are associated with one another in a solvent having a small polarity even when the compound is regarded as dissolved in the solvent, and the molecules are not apart from one another in any case. A solvent having a large polarity is used in order to break the associated molecules apart into the molecules.

Though the above functional compound has adsorbed water and contains electrolytes as impurities, this is caused only locally and most of the compound surface is regarded as nonpolar. This is because the surface is otherwise instable in nature. Accordingly, a large effect is brought about by removing electrolytes in the presence of a hydrous organic solvent for breaking the agglomeration of the functional compound, which is the constitutive requirement of this invention. In an extreme case, the ion-exchange in a non-polar solvent exerts an effect especially.

On the other hand, the binder resin which is a medium in which the functional compound is intended to be dispersed contains polar functional groups, but may be said to be nonpolar as a whole, and in order to disperse the compound therein, it is necessary to previously break the agglomeration of the functional compound before the dispersion or to chemically control this breaking effect in the dispersing step. This invention has been accomplished by adjusting the focus to this point.

Speaking of the equipment function of this invention, apart from the case in which the procedure is carried out from start to finish in the state that a liquid state is kept, the main current of the conventional so-called dispersion system has been mostly a system in which the open state is combined with the local exhaustion. This can be considered to be because the dispersion technique has laid stress on the concept of physical mixing. The present inventors have changed this thought, taken the dispersion technique as a chemical reaction and considered the dispersing machine as a reactor, and have consequently made an environmental pollution-free, closed system usable.

According to this invention, the functional compound can be dispersed in a binder resin with fidelity to the particle diameter distribution which the functional compound has inherently, and the compounds which have heretofore been difficult to disperse can be dispersed effectively.

This invention facilitates dispersion by the removal of impurities and is epoch-making in respect of energy saving as compared with the conventional dispersion procedure which mainly relies upon the mechanical energy. When the dispersion after the removal of impurities is conducted by a vacuum-distillation procedure, a great advantage is obtained in that the dispersion can be carried out by a closed system, and hence, this invention makes a great contribution to the technique.

DESCRIPTION OF PREFERRED EMBODIMENTS

Examples, Reference Examples and Comparative Examples are shown below to explain this invention in more detail.

EXAMPLE 1

(Removal of Electrolyte from Functional Compound)

A commercially available pigment was selected as a functional compound to examine the effect of removing of electrolytes with an ion-exchange resin. The results obtained were as follows: From each of two lots of Phthalocyanine Green 2GN pigment (manufactured by DAINICHISEIKA COLOUR & CHEMICALS MFG. CO., LTD.), 1 g of pigment was taken, and 100 g of tetrahydrofuran was added to each, after which the resulting mixture was stirred gently for 30 minutes, and then subjected to determination of particle size distribution by a laser doppler system particle size distribution measuring apparatus (Microtrack® UPA type). Moreover, liquid pigment mixtures having the same concentration were prepared and to each of the pigment mixtures was added 10 g of a cation-exchange resin WK10 (weak acid type) which had been well washed with deionized water and then subjected to sufficient removal of water, after which the resulting mixture was contact-stirred gently for 30 minutes. Thereafter, the ion-exchange resin was, removed with a bleached cloth of about 70 microns. In the same manner, the mixture obtained was subjected to determination of particle size distribution. The results obtained are shown in Table 1.

TABLE 1

| Particle | Lot 1 | | Lot 2 | |
|---|---|---|---|---|
| diameter (micron) | Before ion exchange | After ion exchange | Before ion exchange | After ion exchange |
| 0.0361 | 0 | 0 | 0 | 0 |
| 0.043 | 0 | 3.35 | 0 | 0 |
| 0.0511 | 0 | 7.25 | 0 | 0 |
| 0.0608 | 0 | 6.56 | 0 | 0 |
| 0.0723 | 0 | 5.22 | 0 | 0 |
| 0.0859 | 0 | 3.99 | 0 | 0 |
| 0.1022 | 0 | 3.36 | 0 | 0.35 |
| 0.1215 | 0 | 3.64 | 0 | 1.7 |
| 0.1445 | 0 | 5.46 | 0 | 2.15 |
| 0.1719 | 0 | 10.29 | 0.96 | 3.21 |
| 0.2044 | 0 | 18.08 | 1.31 | 4.59 |
| 0.2431 | 0.78 | 10.14 | 2.03 | 6.18 |
| 0.2891 | 1.79 | 10.5 | 3.04 | 7.75 |
| 0.3437 | 3.61 | 2.16 | 4.31 | 8.95 |
| 0.4088 | 5.59 | 0 | 5.67 | 9.53 |
| 0.4861 | 6.43 | 0 | 6.8 | 9.39 |
| 0.5781 | 5.93 | 0 | 7.48 | 8.73 |
| 0.6875 | 5.12 | 0 | 7.67 | 7.75 |
| 0.8176 | 4.77 | 0 | 7.48 | 6.64 |
| 0.9723 | 5.27 | 0 | 6.85 | 5.52 |
| 1.1562 | 6.97 | 0 | 5.6 | 4.48 |
| 1.375 | 10.22 | 0 | 3.87 | 3.61 |
| 1.6352 | 13.92 | 0 | 2.28 | 2.91 |
| 1.9445 | 14.52 | 0 | 1.3 | 2.33 |
| 2.3125 | 10.08 | 0 | 0.96 | 1.78 |
| 2.75 | 4.14 | 0 | 1.23 | 1.26 |
| 3.2703 | 0.86 | 0 | 2.76 | 0.87 |
| 3.8891 | 0 | 0 | 6.93 | 0.32 |
| 4.6249 | 0 | 0 | 11.23 | 0 |
| 5.5 | 0 | 0 | 8.18 | 0 |
| 6.5406 | 0 | 0 | 2.06 | 0 |
| 7.5 | 0 | 0 | 0 | 0 |

Reference Example 1

The pigments obtained from the two lots in Example 1 were subjected to twin roll kneading under the following conditions:

Cyanine Green 2GN (manufactured by DAINICHISEIKA COLOUR & CHEMICALS MFG. CO., LTD.) 13.2 kg Vinyl chloride-vinyl acetate resin (VMCC manufactured by UNION CARBIDE CORPORATION) 19.8 kg N-Alkyltrimethylenediamine oleate (Assistor BR-1001 manufactured by DAINIPPON INK & CHEMICALS, INC.)

| | |
|---|---|
| | 0.22 kg |
| Methyl ethyl ketone | 3.3 kg |

The above mixture was kneaded under pressure for 30 minutes by a kneading machine equipped with a pressure plunger and subsequently the mixture was taken out and then subjected to such an operation that on an unequal speed twin roll mill, winding the mixture on the roll for 20 minutes to knead the same and then taking out the mixture in the sheet state were repeated. Thereafter, such a kneading procedure that the sheet was folded, allowed to pass through a roll slit and then folded was repeated 20 times, and lastly, the sheet was taken out, cooled and then pulverized into pellets of indefinite form. Each of the two kinds of pellets obtained by the above process was dissolved over 3 hours in a 20% VMCC solution in methyl ethyl ketone so that the pigment content became 5%, the resulting solution was coated by a 3-mil applicator on the glass plate and the transparency was examined by inspection with naked eye. However, the film obtained from the lot 1 pigment had an excellent transparency, but that obtained from the lot 2 pigment became an opaque film. With the lot 2 pigment, even when the above kneading process was repeated, no transparent film was obtained.

Accordingly, the properties of pigment were examined as to the lot 1 group from which a transparent film was obtained and the lot 2 group from which no transparent film was obtained to obtain results as mentioned below. One gram of the pigment was added to 100 ml of an aqueous solution whose pH had previously been adjusted to the given pH with 1 N hydrochloric acid and ammonia water, the resulting mixture was stirred, and thereafter, the pH was measured to examine the difference between the pH values before and after the stirring, whereby the results shown in Table 2 were obtained.

TABLE 2

| Given | pH (after) - pH (before) | | | |
|---|---|---|---|---|
| | Lot 1 group | | Lot 2 group | |
| pH | Lot 11 | Lot 12 | Lot 21 | Lot 22 |
| 2 | −0.01 | −0.02 | 0.01 | 0.05 |
| 3 | 0.22 | 0.11 | 0.45 | 0.61 |
| 4 | 1.25 | 1.1 | 3.86 | 3.76 |
| 5 | 0.76 | 1.25 | 3.2 | 3.06 |
| 6 | −0.13 | 0.54 | 2.33 | 2.27 |
| 7 | −1.24 | −0.63 | 1.18 | 1.02 |
| 8 | −2.08 | −1.92 | 0.2 | 0.1 |
| 9 | −3.03 | −2.75 | −0.93 | −0.96 |
| 10 | −0.88 | −0.62 | −0.72 | −0.77 |
| 11 | −0.28 | −0.21 | −0.4 | −0.6 |

From the data shown in Table 2, it is understood that the pigment which was unable to be dispersed contains an alkali content as an impurity and hence at a pH in the vicinity of 4 to 5, the pigment functions so as to return the pH to neutral by neutralization. Putting all the particle size distribution data together, it is inferred that in the case of this pigment, the alkali content as the impurity governs the agglomeration and the agglomeration is broken by cation-exchange.

EXAMPLE 2

The ion-exchange effect on Seika Fast Red 3891 (manufactured by DAINICHISEIKA COLOUR & CHEMICALS MFG. CO., LTD.) was examined with the following formula:

| | |
|---|---|
| Dry pigment | 12 parts by weight |
| Isopropyl alcohol | 37 parts by weight |
| Deionized water | 51 parts by weight |

The above mixture was well stirred for 30 minutes to prepare a solution. To a mixture of the same formula as above were added 2 parts by weight of a strongly basic anion-exchange resin activated to an OH type and 2 parts by weight of an H type weakly acidic cation-exchange resin and the resulting mixture was stirred gently. This mixture was subjected to the same separation procedure as stated in Example 1 to obtain an ion-exchange resin-free solution. The two solutions obtained were subjected to examination of particle size distribution by the same particle size distribution measuring procedure as in Example 1. The results obtained are shown in Table 3.

TABLE 3

| Particle size (micron) | Not subjected to ion exchange | Subjected to ion exchange | Particle size (micron) | Not subjected to ion exchange | Subjected to ion exchange |
|---|---|---|---|---|---|
| 0.0054 | | | 0.2044 | | |
| 0.0064 | | | 0.2431 | | |
| 0.0076 | | | 0.2891 | | |
| 0.009 | | | 0.3437 | | |
| 0.0107 | | | 0.4088 | | 0 |
| 0.0128 | | | 0.4861 | | 0.45 |
| 0.0152 | | | 0.5781 | | 1.06 |
| 0.0181 | | | 0.6875 | 0 | 0.31 |
| 0.0215 | | | 0.8176 | 0.67 | 0 |
| 0.0255 | | | 0.9723 | 1.28 | 0 |
| 0.0304 | | | 1.1562 | 2.26 | 0 |
| 0.0361 | | | 1.375 | 3.55 | 0 |
| 0.043 | | | 1.6352 | 4.77 | 0.81 |
| 0.0511 | | | 1.9445 | 5.83 | 4.95 |
| 0.0608 | | | 2.3125 | 7.42 | 21.86 |
| 0.0723 | | | 2.75 | 10.87 | 41.81 |
| 0.0859 | | | 3.2703 | 16.94 | 24.83 |
| 0.1022 | | | 3.8891 | 21.56 | 3.87 |
| 0.1215 | | | 4.6249 | 16.8 | 0 |
| 0.1445 | | | 5.5 | 6.74 | 0 |
| 0.1719 | | | 6.5406 | 1.31 | 0 |
| | | | 10 | 0 | 0 |

From Table 3, it is seen that conversion to finely divided particles is caused by the ion-exchange.

Example 3

An ion-exchange effect on Cyanine Blue 5182 (manufactured by DAINICHISEIKA COLOUR & CHEMICALS MFG. CO., LTD.) was examined with the following formula:

| | |
|---|---|
| Dry pigment | 12 parts by weight |
| Isopropyl alcohol | 37 parts by weight |
| Deionized water | 51 parts by weight |

The above mixture was well stirred for 30 minutes to prepare a solution. Moreover, to another mixture of the same formula as above was added, in place of the ion-exchange resin, 4 parts by weight of a completely water-soluble amphoteric electrolyte polymer solution prepared by placing a mixture of the following formula:

| | |
|---|---|
| Dimethylaminoethyl methacrylate | 40 parts by weight |
| Methacrylic acid | 16 parts by weight |
| 2-Hydroxyethyl methacrylate | 6 parts by weight |
| 2-Ethylhexyl methacrylate | 20 parts by weight |
| 2-Ethylhexyl acrylate | 10 parts by weight |
| Acrylamide | 2 parts by weight |
| Methyl methacrylate | 5 parts by weight |
| 2-Mercaptoethanol | 5 parts by weight |
| Azobisisobutyronitrile | 0.3 part by weight |

in a polyethylene bag having a thickness of 1 cm, a width of 15 cm and a length of 30 cm prepared using a polyethylene sheet having a thickness of 50 microns, then subjecting the mixture to sack polymerization in a warm water of 68° C. for 6 hours to prepare a bulk polymerization product, namely an amphoteric electrolyte polymer, in the form of a sheet, and dissolving the polymer in deionized water so that the concentration became 30%; and then gently stirring the resulting mixture to subject the same to ion-exchange to prepare two sample solutions. The two sample solutions were subjected to measurement of particle size distribution by the same procedure as in Example 1 to obtain the results shown in Table 4.

TABLE 4

| Particle size (micron) | Not subjected to ion exchange | Subjected to ion exchange | Particle size (micron) | Not subjected to ion exchange | Subjected to ion exchange |
|---|---|---|---|---|---|
| 0.0054 | | | 0.2044 | | |
| 0.0064 | | | 0.2431 | | |
| 0.0076 | | | 0.2891 | | |
| 0.009 | | | 0.3437 | | |
| 0.0107 | | | 0.4088 | 0 | 0 |
| 0.0128 | | | 0.4861 | 0.93 | 0.32 |
| 0.0152 | | | 0.5781 | 1.47 | 1.16 |
| 0.0181 | | | 0.6875 | 2.08 | 2.93 |
| 0.0215 | | | 0.8176 | 2.69 | 6.31 |
| 0.0255 | | | 0.9723 | 3.38 | 11.03 |
| 0.0304 | | | 1.1562 | 4.53 | 15.43 |
| 0.0361 | | | 1.375 | 6.95 | 17.02 |
| 0.043 | | | 1.6352 | 12.03 | 14.72 |
| 0.0511 | | | 1.9445 | 20.1 | 10.48 |
| 0.0608 | | | 2.3125 | 24.7 | 7.02 |
| 0.0723 | | | 2.75 | 16.27 | 4.91 |
| 0.0859 | | | 3.2703 | 4.52 | 3.6 |
| 0.1022 | | | 3.8891 | 0.35 | 2.58 |
| 0.1215 | | | 4.6249 | 0 | 1.65 |
| 0.1445 | | | 5.5 | 0 | 0.64 |
| 0.1719 | | | 6.5406 | 0 | 0 |
| | | | 10 | 0 | 0 |

From Table 4, it is seen that similarly to Examples 1 and 2, conversion to finely divided particles was caused by ion-exchange.

EXAMPLE 4

An ion-exchange effect on a hydrous paste was examined.

To 94.3 g of tetrahydrofuran was added 5.7 g of a hydrous paste containing Carmine 6B at a concentration of 21% and the resulting mixture was gently stirred for 30 minutes. Another mixture of the same formula was prepared and thereto were added 2 g of an anion-exchange resin SA-20A activated to an OH type and thoroughly drained and 2 g of a cation-exchange resin WK-10 thoroughly washed with deionized water; the resulting mixture was gently stirred for 30 minutes; and thereafter, the ion-exchange resins were removed with a gauze. The two solutions thus obtained were subjected to measurement of particle size distribution by the same procedure as in Example 1 to obtain the results shown in Table 5.

TABLE 5

| Particle size (micron) | Not subjected to ion exchange | Subjected to ion exchange |
|---|---|---|
| 0.0054 | | |
| 0.0064 | | |
| 0.0076 | | 0.35 |
| 0.009 | | 3.5 |
| 0.0107 | 0 | 19.47 |
| 0.0128 | 22.55 | 26.35 |
| 0.0152 | 24.75 | 23.45 |
| 0.0181 | 19.37 | 12.88 |
| 0.0215 | 13.32 | 8.64 |
| 0.0255 | 8.29 | 2.74 |
| 0.0304 | 4.91 | 1.54 |
| 0.0361 | 2.88 | 0.76 |
| 0.043 | 1.74 | 0.32 |
| 0.0511 | 1.09 | 0 |

TABLE 5-continued

| Particle size (micron) | Not subjected to ion exchange | Subjected to ion exchange |
|---|---|---|
| 0.0608 | 0.71 | 0 |
| 0.0723 | 0.39 | |
| 0.0859 | | |
| 0.1022 | | |
| 0.1215 | | |
| 0.1445 | | |
| 0.1719 | | |

Though the hydrous paste was originally not so much agglomerated, it was confirmed that there was an effect of conversion to finely divided particles by ion-exchange.

EXAMPLE 5

In a SUS vessel of 200 L was placed 10 kg of Phthalocyanine Green 2GN (C.I. Pigment Green 7) pigment of the same lot as lot 2 in Example 1 and then stirred in a high speed stirring machine while 10 kg of an equal weight mixture of ethanol and tetrahydrofuran was added little by little, and thereafter, addition of deionized water was substituted for the addition of the equal weight mixture, after which the mixture was slowly stirred in a low speed stirring machine until it became a slurry state and then diluted so that the total weight became 100 kg. The resulting mixture was circulated with stirring for 30 minutes at a flow rate of about 20 L/min in a hard vinyl chloride resin column having an inner diameter of 150 mm and an internal volume of 3 L packed with about 2 L of an ion-exchange resin WK-10 (manufactured by Mitsubishi Chemical Co., Ltd.) (a SUS wire net of 200 mesh was set at each end of the column) to remove the electrolytes. The thus treated mixture was subjected to centrifugal dehydration filtration with a broadcloth filter bag. The pigment concentration was adjusted so as to become 40% with deionized water while the concentration was metered. This procedure was repeated to obtain 150 kg in total of a paste. This was kneaded with other materials with the following formula in a 500-L kneading machine as shown in FIG. 2:

The above paste 146.5 parts by weight

Vinyl chloride-vinyl acetate resin (VMCC manufactured by Union Carbide) 87.9 parts by weight N-Alkyltrimethylenediamine oleate (Assistor BR-1001 manufactured by DAINIPPON INK & CHEMICALS, INC.)

| | |
|---|---|
| | 0.97 part by weight |
| Methyl ethyl ketone | 14.6 parts by weight |

Kneading was conducted while the temperature was elevated from room temperature to 90° C. over 20 minutes and then to 95° C. over 10 minutes. Subsequently, the pressure was gradually reduced while heating was continued to remove water and the solvent by distillation. The temperature reached finally was 110° C. and the absolute pressure was 400 mmHg, and the time required was 80 minutes. Thereafter, the pressure was returned to normal pressure, cooling was conducted and the cover was opened, after which the vessel was sufficiently cooled to the vicinity of room temperature and then a kneaded mixture in the form of a block was taken out. This mixture was tested according to the same evaluation procedure as in Reference Example 1 to obtain a coating film having transparency at least equivalent to that when the lot 1 pigment was used. This proves that when the process of this invention is used, the formation of finely divided particles of a functional compound which has not been reached by a conventional roll method can be achieved without using the roll.

EXAMPLE 6

In a SUS vessel of 200 L was placed 24 kg of a hydrous paste containing Carmine 6B (C.I. Pigment Red 57:1) pigment at a concentration of 21%, and then stirred in a high-speed stirring machine while 10 kg of ethanol was added thereto little by little. Moreover, the addition of ethanol was replaced by addition of deionized water and the stirring was conducted slowly this time in a low-speed stirring machine, after which the mixture was diluted with the deionized water so that the total weight became 100 kg. This diluted product was circulated at a flow rate of about 20 L/min for 30 minutes in a set of hard vinyl chloride resin columns set in series, each of which columns had an inner diameter of 150 mm and an internal volume of 3 L, one of which columns was packed with about 2 L of an ion-exchange resin WK-10 (manufactured by Mitsubishi Chemical Co., Ltd.) (a SUS wire net of 200 mesh was set at each end of the column) and the other was packed with an anion-exchange resin SA-20A (manufactured by Mitsubishi Chemical Co., Ltd.) activated to an OH type, to remove electrolytes. The mixture was subjected to centrifugal hydration filtration with a broadcloth filter bag. The pigment concentration was adjusted with deionized water so as to become the initial 21% concentration while it was metered. This procedure was repeated to obtain 240 kg in total of a paste. This paste was placed in a kneading machine having a volume of 500 L as shown in FIG. 2 and thereto was added 120 kg of a polyester resin having a softening point of 110° C. and a weight average molecular weight of about 9,000, after which the resulting mixture was kneaded by the same procedure as in Example 5. The temperature reached was 120° C., the pressure was 250 mmHg and the time required was 90 minutes. By the same operation as in Example 5, a kneaded mixture in the form of a block was taken out. It was found that the product obtained by the process of this invention was improved in performance and remarkably shortened in process time as compared with Comparative Example 1 which appears hereinafter.

Comparative Example 1

The paste before the electrolyte-removing step in Example 6 was kneaded without using the vacuum-distillation equipment of FIG. 2. Because of normal pressure, the water content discharged gathered in a kneading machine, and each time, such an operation was necessary that the operation was stopped and the water was taken out by decantation. In addition, the time for completing dehydration is greatly increased and a period of 310 minutes was required. The temperature reached was substantially the same. Each of the kneaded mixtures obtained in Example 6 and Comparative Example 1 was dissolved in tetrahydrofuran so that the concentration became 5% and the resulting solution was coated on a glass plate by a 3-mil applicator, after which the two coating films obtained were compared with each other. As a result, it was clarified that the coating film obtained in Example 6 which is the working example of this invention was superior in gloss, color strength and transparency and that the performance was improved and the process was shortened.

What is claimed is:

1. A process for producing a material composed of a functional compound finely dispersed into a binder resin, wherein the compound is in the form of particles having an average particle diameter of not more than 3 microns, and a portion of the functional compound is initially in the form of an agglomeration of said particles which are broken apart before dispersion, the process comprising the following steps:

adding de-ionized water to said functional compound particles to form a hydrous paste of the compound containing a portion of agglomerated particles, wherein the compound is initially in a dry state and the compound contains impurity ions;

removing said impurity ions to produce impurity ion free hydrous paste containing unagglomerated particles, by contacting said hydrous paste with an ion exchange substance having an ion exchange function selected depending upon the properties of the impurity ions, said ion exchange substance being in a mixed solvent composed of de-ionized water and an organic solvent miscible with water; and dispersing the impurity ion free, hydrous paste in a binder resin.

2. A process for producing a material composed of a functional compound, finely dispersed into a binder resin wherein the compound is in the form of particles having an average diameter of not more than 3 microns, and a portion of the functional compound is initially in the form of an agglomeration of said particles which are broken apart before dispersion, the process comprising the following steps:

adding de-ionized water to said functional compound particles to form a hydrous paste of the compound containing a portion of agglomerated particles, wherein the compound is initially in a dry state and the compound contains impurity ions;

removing said impurity ions to produce impurity ion free hydrous paste containing unagglomerated particles, by contacting said hydrous paste with an ion exchange substance having an ion exchange function selected depending upon the properties of the impurity ions; and dispersing the impurity ion free hydrous paste in a binder resin.

3. The process for producing a finely dispersed material according to claim 1 or 2, wherein the dispersion after the removal of the impurity ions is conducted by kneading the hydrous paste after the removal of the impurity ions with the binder resin in which the hydrous paste after the removal of the impurity ions is intended to be dispersed, at a temperature not lower than the softening point of the binder resin at a reduced pressure of not more than 1 atm. in a kneading machine equipped with an internal temperature-controlling means, a variable cooling water amount-controlling means, a vapor condenser, a distilled liquid-receiver, an exhausting means for reducing pressure and a kneading means having a twin screw, to simultaneously conduct the water-removal and the dispersion in the binder resin in a closed system.

4. The process for producing a finely dispersed material according to claim 1 or 2, wherein the dispersion after the removal of the impurity ions is conducted by a general dispersing procedure which has heretofore been used, to obtain an aqueous dispersion.

5. The process for producing a finely dispersed material according to claim 1 or 2, wherein the substance having an ion-exchange function is an ion-exchange resin.

6. The process for producing a finely dispersed material according to claim 1 or 2, wherein the substance having an ion-exchange function is an amphoteric electrolyte polymer.

7. The process for producing a finely dispersed material according to claim 1 or 2, wherein the compound having a functionality is a pigment.

8. The process for producing a finely dispersed material according to claim 1 or 2, wherein the binder resin is a polyester resin.

* * * * *